United States Patent
Walsh et al.

(10) Patent No.: US 7,487,254 B2
(45) Date of Patent: Feb. 3, 2009

(54) FIXED LENGTH FILTERING TO FILTER CLUSTERS OF DISCRETE SEGMENTS OF DATA

(75) Inventors: Rod Walsh, Tampere (FI); Tomi Hakkarainen, Nokia (FI); Juha-Pekka Luoma, Tampere (FI)

(73) Assignee: Nokia Corporation, Espoo (FI)

( * ) Notice: Subject to any disclaimer, the term of this patent is extended or adjusted under 35 U.S.C. 154(b) by 770 days.

(21) Appl. No.: 10/027,048

(22) Filed: Dec. 20, 2001

(65) Prior Publication Data

US 2003/0135636 A1    Jul. 17, 2003

(51) Int. Cl.
*G06F 15/16* (2006.01)
(52) U.S. Cl. .................. 709/238; 709/232; 709/245; 370/351; 370/497; 370/470
(58) Field of Classification Search .......... 709/245, 709/235, 232; 370/389
See application file for complete search history.

(56) References Cited

U.S. PATENT DOCUMENTS

| | | | |
|---|---|---|---|
| 5,473,607 A * | 12/1995 | Hausman et al. ............ 370/392 |
| 5,544,161 A | 8/1996 | Bigham |
| 5,548,340 A | 8/1996 | Bertram |
| 5,790,554 A * | 8/1998 | Pitcher et al. ............... 370/471 |
| 5,951,651 A * | 9/1999 | Lakshman et al. ........... 709/239 |
| 6,047,333 A * | 4/2000 | Roussel ...................... 709/250 |
| 6,085,328 A * | 7/2000 | Klein et al. ................... 713/310 |
| 6,175,577 B1 | 1/2001 | Van Den Heuvel |
| 6,275,989 B1 | 8/2001 | Broadwin et al. |
| 6,289,013 B1 * | 9/2001 | Lakshman et al. ........... 370/389 |
| 6,313,763 B1 * | 11/2001 | Lambert ..................... 341/50 |
| 6,341,130 B1 | 1/2002 | Lakshman et al. |
| 6,347,087 B1 * | 2/2002 | Ganesh et al. ............... 370/392 |
| 6,370,583 B1 * | 4/2002 | Fishler et al. ................ 709/238 |
| 6,728,241 B2 * | 4/2004 | Hakkarainen et al. ........ 370/389 |
| 6,782,241 B2 * | 8/2004 | Kobayashi ................... 455/88 |

FOREIGN PATENT DOCUMENTS

| | | |
|---|---|---|
| EP | 0 964 572 A | 12/1999 |
| EP | 1 089 470 A1 | 4/2001 |
| EP | 1 267 579 A | 12/2002 |
| WO | WO 00/65429 | 11/2000 |

OTHER PUBLICATIONS

International Search Report from International Application No. PCT/IB02/05382.
European Telecommunications Standards Institute, "Digital Video Broadcasting (DVB); Specification for Service Information (SI) in DVB Systems", EN 300 468 V1.3.1 (Feb. 1998).

(Continued)

*Primary Examiner*—F. Zeender
*Assistant Examiner*—Ramsey Refai
(74) *Attorney, Agent, or Firm*—Banner & Witcoff, Ltd.

(57) ABSTRACT

Methods and systems are provided for filtering digital data formatted in packets. A filter module contains a plurality of filters and is coupled to a filter mapping module. The filter mapping module receives the identification of clusters of discrete segments of a packet and selects a group of fixed length filters to filter the clusters.

29 Claims, 6 Drawing Sheets

OTHER PUBLICATIONS

European Telecommunications Standards Institute, "Digital Video Broadcasting (DVB); Implementation Guidelines for the Use of MPEG-2 Systems, Video and Audio in Satellite, Cable and Terrestrial Broadcasting Applications", ETSI TR 101 154 V1.4.1 (Jul. 2000).

European Search Report for EP 02 78 1645 completion date Mar. 4, 2008.

Office Action issued in EP 02 781 645.3-2223 dated May 16, 2008.

\* cited by examiner

FIXED LENGTH FILTERING TO FILTER CLUSTERS OF DISCRETE SEGMENTS OF DATA

BACKGROUND OF THE INVENTION

1. Field of the Invention

The invention relates to data filtering. More particularly, the invention relates to systems and methods for filtering packets of data.

2. Description of Related Art

Digital data is typically transported from one location to another in packets having well-defined segments. FIG. 1, for example, illustrates a DVB DSM-CC Private Data Section MPE (MultiProtocol Encapsulation) packet 100 that may be used to transport audio, video or other data. Packet 100 includes several distinct segments that are defined by a protocol. For example, the MAC address is formed from different segments of packet 100.

Components that are configured to filter packets read information found in the different segments within the packet. For example, a digital video broadcast (DVB) receiver may read the information found in table id segment section 102, MAC address 1 segment 104, MAC address 2 segment 106 and MAC address 5 segment 108. Conventional hardware based filters are configured to read contiguous segments of data. When the desired data is found in clusters and is not contiguous, resources are wasted when excessively large filters are utilized to filter the clusters of data. Cluster is a generic term and may include a contiguous segment or a set of contiguous data within a packet or a segment of a packet. With respect to packet 100, table id 102 and MAC address segment 5 108 are found in non-contiguous segments or clusters. When a single filter is utilized to filter bits 0-40, the desired clusters are filtered along with several bits of unneeded data. As a result, the size of the filter is unnecessarily large.

Devices that incorporate fixed filters that are designed to filter data in predetermined segments of packets transmitted in predetermined protocols provide limited flexibility. Initially, the filters may be sized and configured in an optimal manner for a given application. However, when the device attempts to filter data that this transmitted in a slightly different protocol, the size and configuration of filters may not be optimized.

Some conventional devices utilize small fixed length filters and filter segments of packets in consecutive stages. As the number of consecutive filter stages increases, the time required to process the data also increases.

Therefore, there exists a need in the art for packet filtering systems and methods that provide flexibility to designers, optimize the use of filter components and minimize the number of consecutive filtering stages that are required to filter data.

BRIEF SUMMARY OF THE INVENTION

One or more of the above-mentioned needs in the art are satisfied by the disclosed systems and methods for processing packetized digital data. The hardware and software modules may be utilized to match filter components to data to be filtered.

In a first embodiment of the invention, a device for filtering data is provided. The data is formatted in a packet having discrete segments. The device includes a filter module comprising a plurality of fixed length filters. A mapping module contains control logic for performing steps including receiving the identification of at least two clusters of the discrete segments of data; and selecting at least two of the plurality of fixed length filters to filter the at least two clusters.

In another embodiment of the invention, a method of generating a map for use by a filter module to filter clusters of data found in a packet of data is provided. The method includes the steps of receiving the identification of at least two clusters of the discrete segments of data; and selecting at least two of a plurality of fixed length filters to filter the at least two clusters.

In other embodiments of the invention, computer-executable instructions or control logic for implementing the disclosed methods are stored on computer-readable media or implemented with hardware modules.

Other features and advantages of the invention will become apparent with reference to the following detailed description and the figures.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
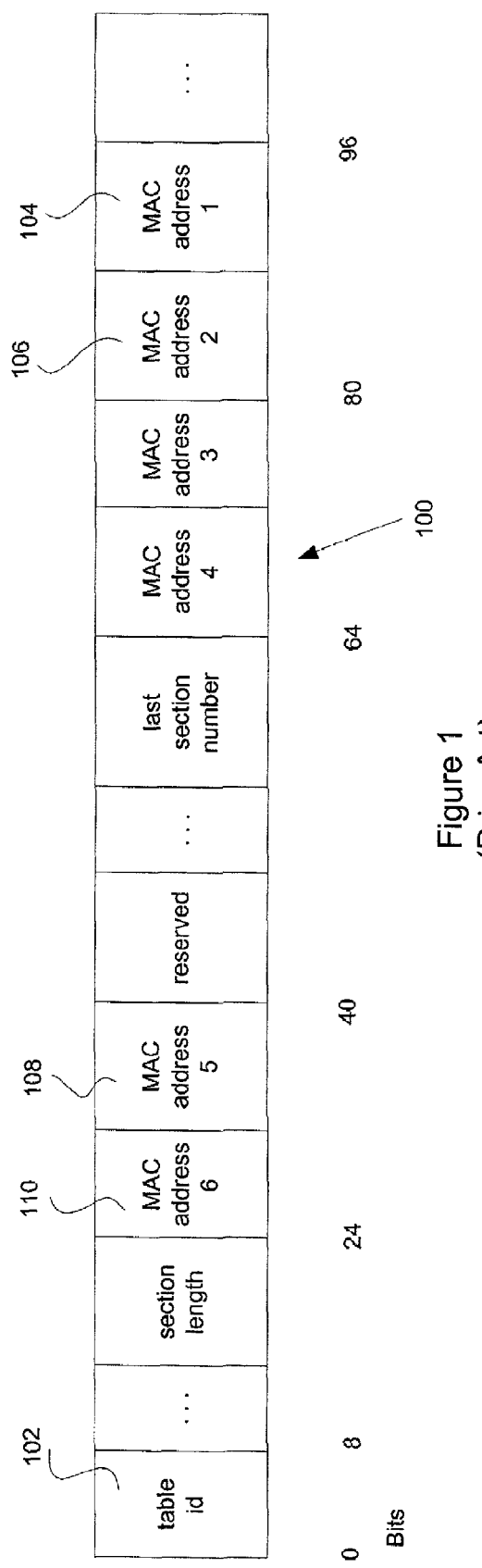
FIG. 1 shows a conventional DVB DSM-CC Private Data Section MPE (MultiProtocol Encapsulation) packet.
Figure 4:
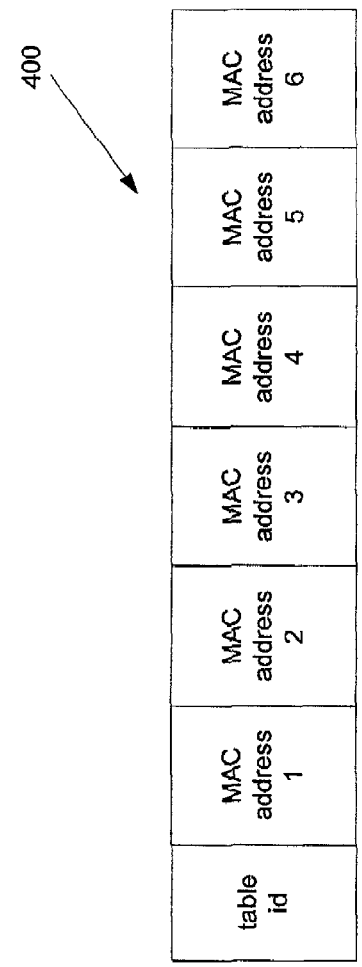
FIG. 4 illustrates an arrangement of discrete packet segments, in accordance with an embodiment of the invention.
Figure 2:
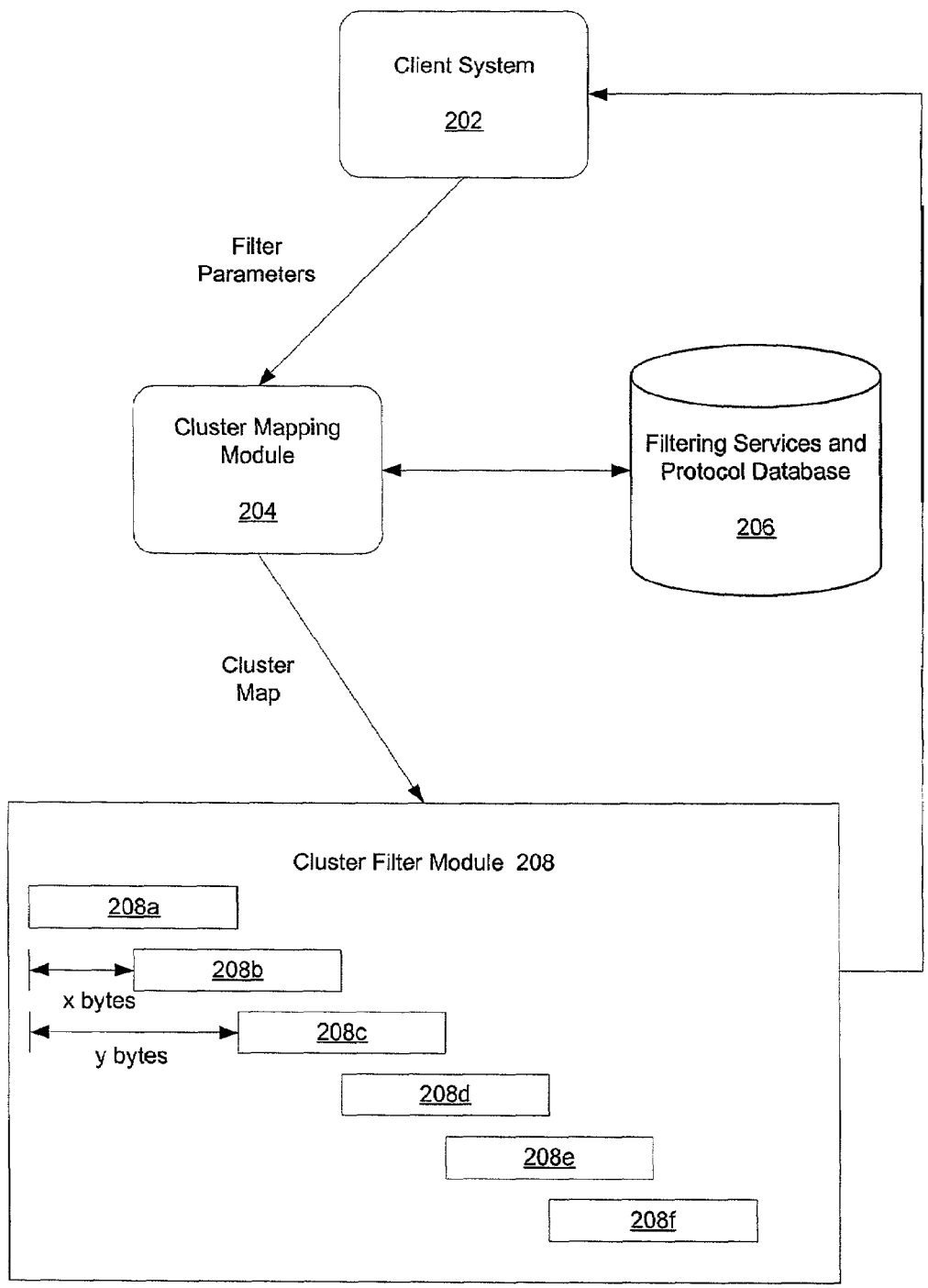
FIG. 2 illustrates a system for filtering clusters of data found in packets, in accordance with an embodiment of the invention.

FIG. 2 illustrates a system for filtering clusters of data found in packets, in accordance with an embodiment of the invention. As used herein, the term "packet" encompasses any digital data formatted in a protocol having discrete segments. Moreover, a packet may include data formatted in a first protocol that has been encapsulated or framed according to one or more additional protocols, for example Internet protocol (IP) packets encapsulated for transmission across a DVB network. A client system 202 transmits filter parameters to a cluster mapping module 204. Client system 202 maybe implemented with software and/or hardware components that include: a DVB receiver, user interface, mobile terminal, or any other hardware or software component that processes clusters of data found in digital packets. The filter parameters may include the identification of clusters of data located in segments of packets having a known protocol. For example, client system 202 may indicate that it desires to process table id 102 and MAC address sections 1-6 (shown in FIG. 1). In another example, client system 202 may indicate that it desires to filter a DVBT interface for an IPv6 address. Cluster mapping module 204 may then create a cluster map from the filter parameters received from client system 202. The cluster map may then be transmitted to a cluster filter module 208.

The cluster map may include information such as a number of filters that will be utilized, the offset values of each of the filters, a filter mask and combinatory logic functions for each filter. An offset value identifies a point, from the beginning of a packet, at which a given filter will begin filtering operations. A filtering services and protocol database 206 may be included to store filtering and protocol information. The formats of any number of protocols and the locations of sections of data within the protocols may be stored in database 206. Cluster maps may also be stored in database 206 to reduce the processing steps performed when a filter map has previously been created for a set of filter parameters. Instead of creating a new cluster map, the previously created cluster map may be retrieved from database 206.

Cluster filter module 208 includes six two-byte filters 208a-208f. In some embodiments of the invention, multiple identical filters are utilized because of the relative ease with which multiple identical filters maybe implemented in hardware. In alternative embodiments, the cluster filter module may include filters having a variety of different sizes and offset values. The sizes and offset values may be selected to correspond to predetermined applications and/or predetermined protocols by cluster mapping module 204. FIG. 2 shows that filter 208a has an offset value of 0 bytes, that filter 208b has an offset value of x bytes and that filter 208c has an offset value of y bytes. The offset values are measured from the beginning of a packet. FIG. 2 shows an embodiment in which filters 208a-208f overlap. In other embodiments, filters 208a-208f may be formed so that some or none of filters 208a-208f overlap to conserve resources.

Figure 2A:
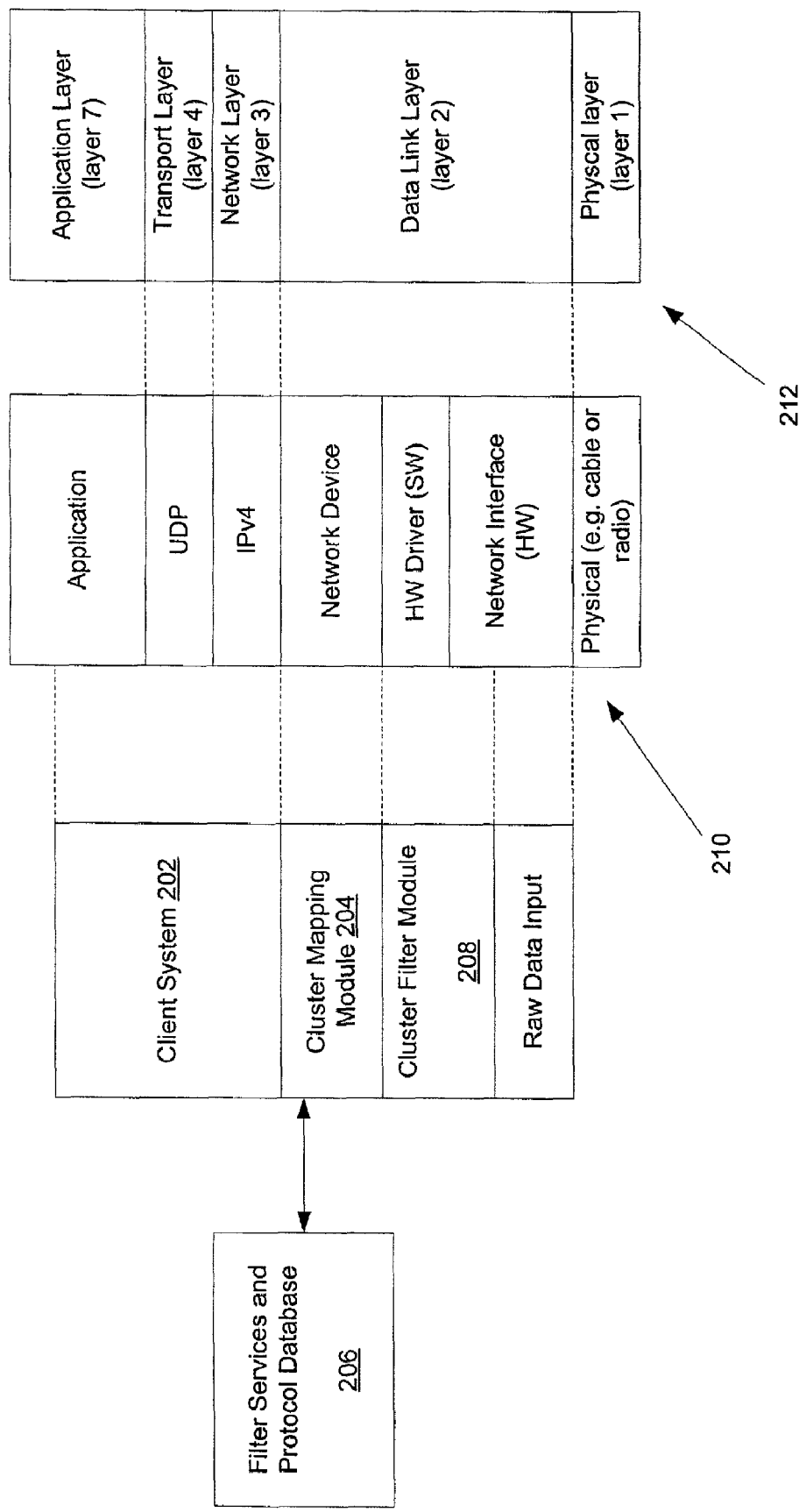
FIG. 2a illustrates a relationship between network layers and software modules, in accordance with an embodiment of the invention.

FIG. 2a illustrates a relationship between the components shown in FIG. 2 and an IP stack of a user device 210 and operating system network layers 212. Client system 202 passes filter parameters to cluster mapping module 204 that may be native to its own environment. For example, the filter parameters could come from a typical filter request such as an IGMP join message, which could pass only details of an IP destination address and a port. Cluster mapping module 204 may also interpret the request for the detailed filter parameters of a specific network interface. For example, if the interface were DVB, cluster mapping module 204 may map the IP address and port to one or more of: PID, table id, Section MAC address segments and IP address.

Figure 3:
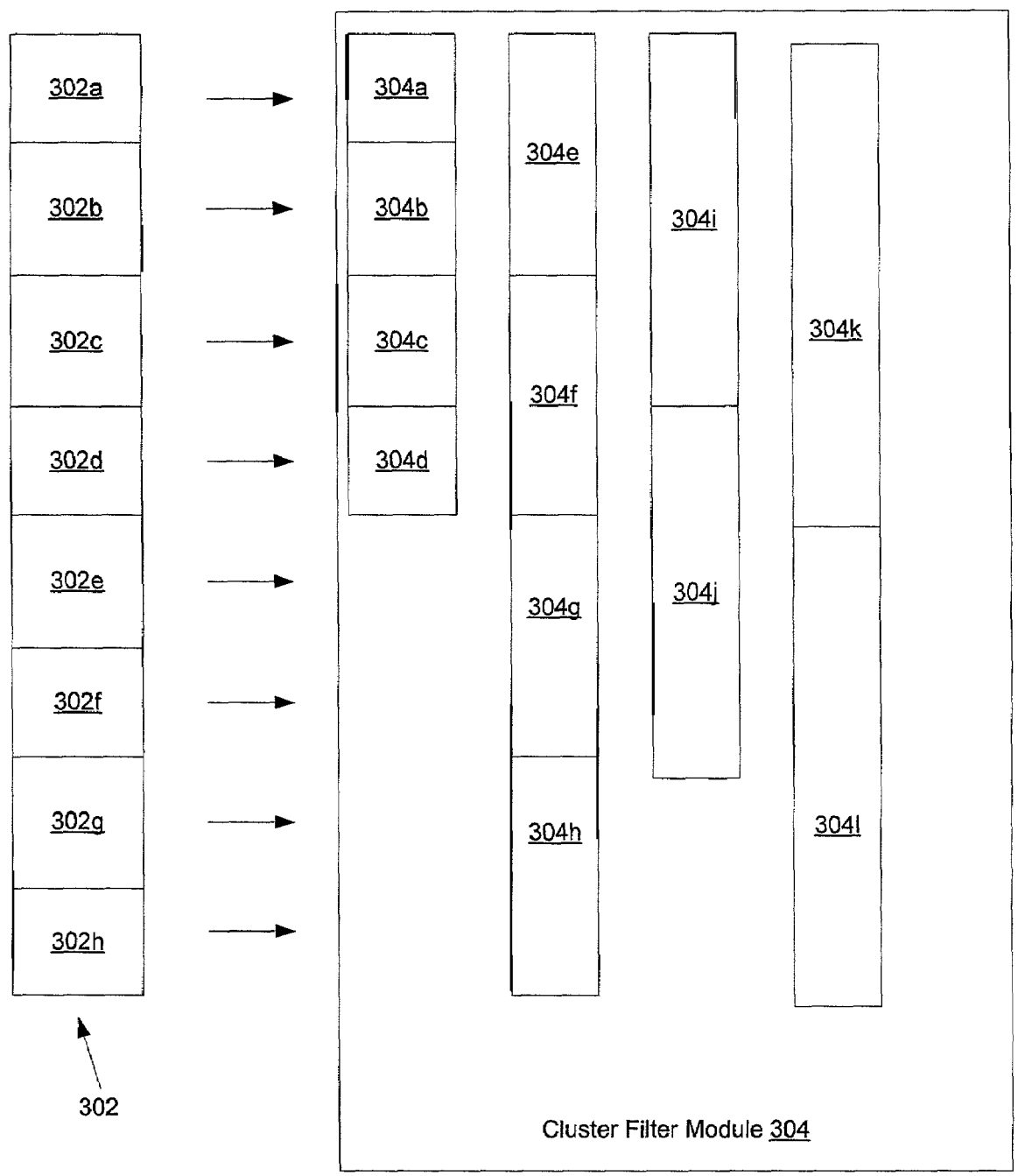
FIG. 3 illustrates the operation of a cluster filter module, in accordance with an embodiment of the invention.

The following description of the formation and use of a cluster map is made with reference to the cluster filter module 304 shown in FIG. 3. A packet stream 302 includes packets 302a-302h. Filter cluster module 304 includes a pool of filter elements 304a-304l. Filters 304a-304d are 1 byte filters, filters 304e-304h are 2 byte filters, filters 304i and 304j are 3 byte filters and filters 304k and 304l are 4 byte filers. Of course any number of filters and any combination of filter sizes may be included in cluster filter module 304. In operation, one or more of filters 304a-304l are selected for a filtering operation. A cluster map generated by cluster mapping module 204 may include the number of filters used, individual offset values, filter masks with desired filter values, applicable combinatory logic for each filter element, and applicable combinatory logic for all the filter elements of a specific filter request (mapped filters).

Combinatory logic may be used as an optimization for certain application cases. A first case of this is where two or more filter parameters (or parts of) allow fewer filters to be used—i.e. filter resource optimization. For example, if the only difference between two sets of filter parameters from two filter requests from client system 202 to cluster mapping module 204 is in the last bit of an IP address (e.g. last bytes are 10000011 and 10000010) then at least two optimizations are possible. In a first optimization, all other filters (not for this one address segment) may be shared (e.g. only a single filter is operating on the highest address bits as they are the same in both cases). In a second optimization, only a single filter is needed for both of the segments by optimizing the mask (e.g. a single 1000001x bit mask). A second case of combinatory logic is where a plurality of physical filters of cluster filter module 204 are used in a plurality of filter requests.

Combinatory logic may also be used to combine the result of these physical filters to calculate the result for the complete filter request. For example, if filter request A requires that the results of physical filter X is true and the result of physical filter Y is true, then some combinatory logic can be employed to calculate the result of filter request A. In another example, filter request B may require that physical filter X is true and physical filter Z is false. One skilled in the art will recognize that OR, XOR, AND, NOR, other functions and any combinations of these may be employed in embodiments of the present invention. Moreover, one skilled in the art will also recognize that combinatory logic could be multi-stage, including hierarchical schemes of producing a filter result from several combinatory stages.

Figure 5:
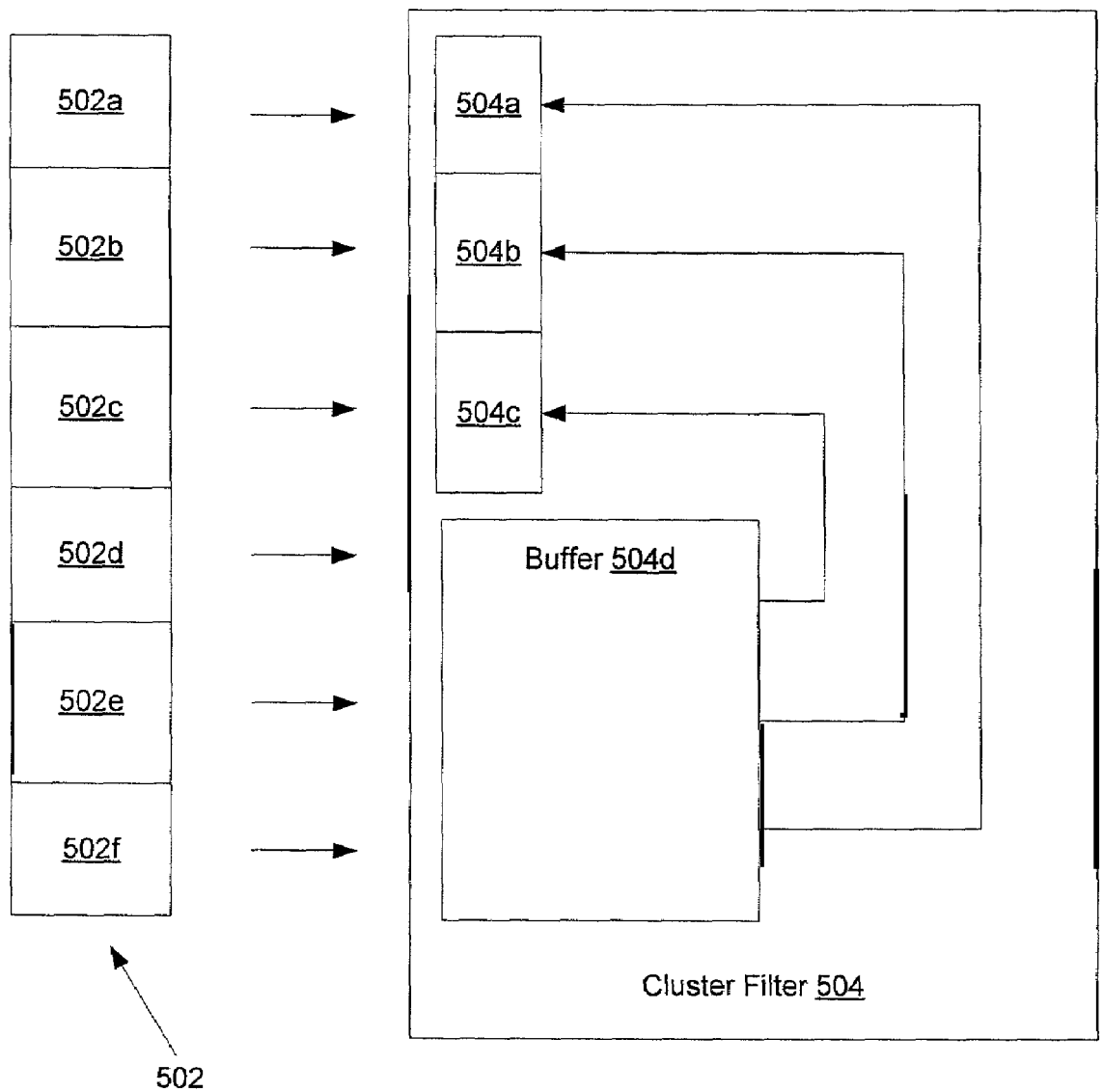
FIG. 5 illustrates a multistage cluster filter in accordance with an embodiment of the invention.

Aspects of the present invention may be applied to multistage filtering devices. FIG. 5 illustrates a multistage filter embodiment. A packet 502 having six data sections arrives at a cluster filter module 504. Cluster filter module 504 includes three two byte filters 504a-504c. One skilled in the art will appreciate that any number of filter elements maybe included within cluster filter module 504 and that the filter elements may have a variety of different sizes and offset values. In the embodiment shown, the first three sections of packet 502 are filtered by filters 504a-504c in the manner described above. The fourth through sixth sections of packet 502 are received at a buffer 504d. Filters 504a-504c filter the first three sections of data in a first stage. In a second stage, filters 504a-504c receive and filter the fourth through sixth sections of data. The fourth through sixth sections of data are received from buffer 504d. Multistage filtering may be utilized in applications in which it is desirable to minimize the number of filter elements within the cluster filter module and when the particular application allows for a relatively longer time period to filter the data.

Figure 6:
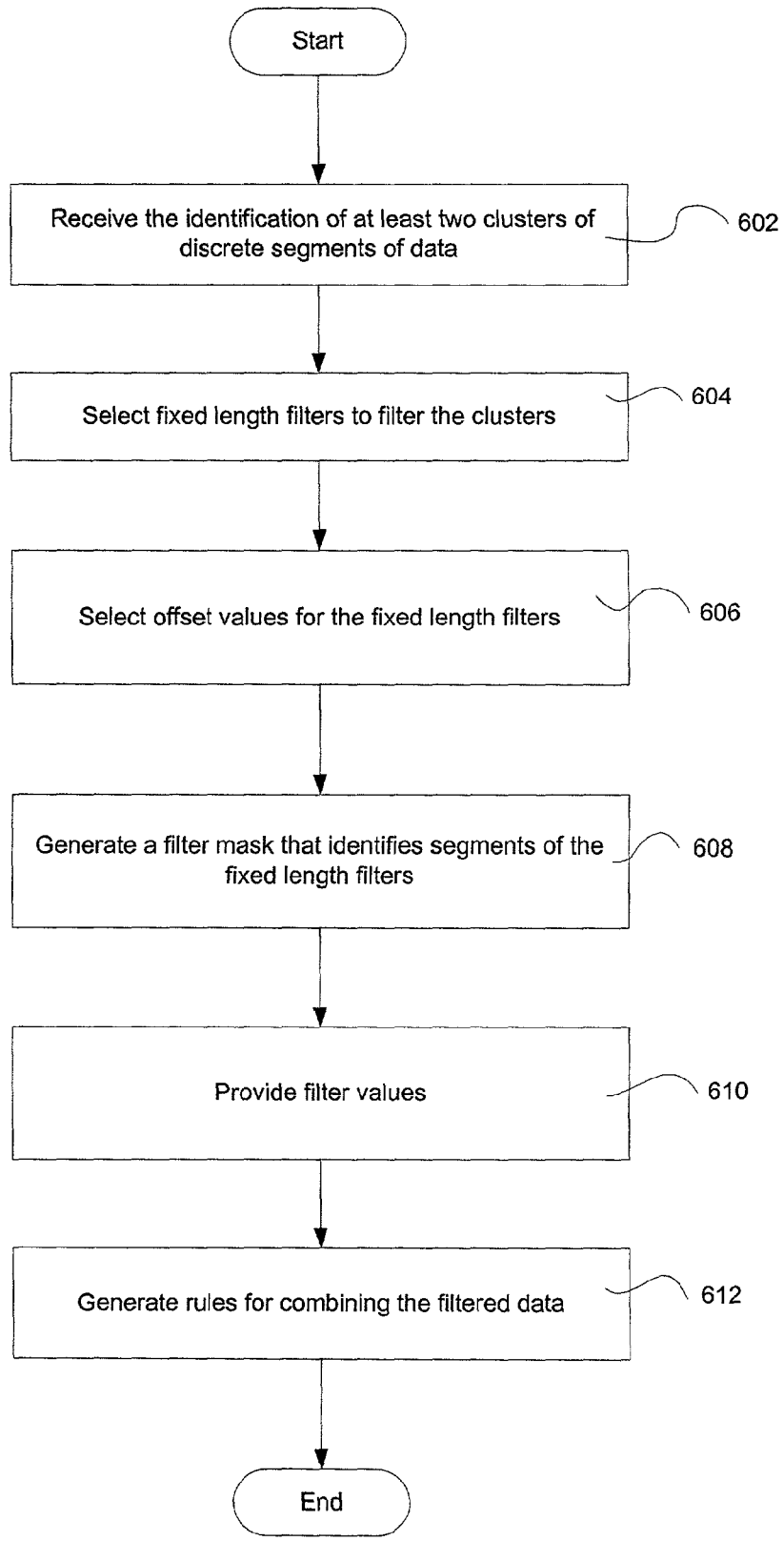
FIG. 6 shows a flowchart including steps that may be performed by a cluster mapping module, in accordance with an embodiment of the invention.

FIG. 6 illustrates a method that may be implemented by cluster mapping module 204 to generate a cluster map, in accordance with an embodiment of the invention. The filter module filters clusters of data found in a packet of data. First, in step 602, the identification of at least two clusters of discrete sections of data is received. Client system 202 may transmit the identification of clusters to cluster mapping module 204. Next, in step 604, individual fixed length filters are selected. The selection may be based on factors such as the sizes and locations of the clusters. In step 606, the offset values are selected. Offset values have been described above and may be selected so that filter resources are optimized. The offset values may be selected to correspond to the beginning of the clusters of discrete sections of data. For example, if a cluster of data consists of sections 108 and 110 of packet 100 (shown) in FIG. 1, an offset value of 24 bits may be selected to prevent filtering unneeded bits.

In step 608, a filter mask that identifies segments of the selected filters is generated. For example, if the cluster filter module includes two 2 two byte filters, the mask could be 11111111 00000000 11110000 11111111 (binary). The mask indicates that in the first fixed 2 byte filter, only the higher byte is utilized in the filtering. In the second 2 byte filter, the 4 highest bits and the lower byte are utilized in the filtering. Next, in step 610, the filter values are provided. In one embodiment, the filter values are received from client system 202. As an example, a filter value corresponding to the above filter mask could be 10111001 xxxxxxxx 1010xxxx 11001010 (binary). The filter value means that the value of the filtered data should be 10111001 for the higher byte in the first fixed filter. The value of the lower byte is ignored in the first fixed filter. In the second fixed filter the filter value could be 0011xxxx 10100000. The value x corresponds to a "don't care" value and is set by the mask value. Finally, in step 612, combinatory rules may be generated for combining the filtered data.

One skilled in the art will also appreciate that filtering may include the process of: analyzing data to match certain criteria (including any combination of analysis), and then either passing through data to a next stage or dropping it. In some embodiments, the analyzed data and passed data share some commonality. For example, a layer 2 header and a layer 3 packet may be filtered by analyzing the layer 2 head and the layer 3 packet and only passing the layer 3 packet. In alternative embodiments, the analyzed data and the passed data may have no commonality. For example, a layer 2 header may be analyzed and a layer 3 packet may be passed.

While the invention has been described with respect to specific examples, those skilled in the art will appreciate that there are numerous variations and permutations of the above described systems and techniques that fall within the spirit and scope of the invention as set forth in the appended claims. For example, the disclosed methods may be implemented as computer-executable instructions recorded on a computer readable medium such as a floppy disk or CD-ROM or as specified hardware, such as an ASIC or FPGA. The invention could be used for other network interfaces than DVB, for example, IP packets in Ethernet frames.

We claim:

1. An apparatus comprising:
a processor configured to execute control logic to perform operations that include
receiving, from a client system processing clusters of data found in digital packets, an identification of at least two clusters of discrete segments of data within at least one of said digital packets, wherein a first one of the at least two clusters of data is formatted in accordance with a first protocol and a second one of the at least two clusters of data is formatted in accordance with a second protocol different than the first protocol, and wherein receiving an identification of at least two clusters includes receiving an identification of a protocol of the data and a value; and
processing the identification to select at least two fixed length filters from a plurality of fixed length filters to filter the at least two clusters, wherein each of the selected at least two fixed length filters has an offset value corresponding to a beginning of one of the at least two clusters.

2. The apparatus of claim 1, wherein the plurality of fixed length filters have a common length.

3. The apparatus of claim 2, wherein each of the plurality of fixed length filters is 2 bytes.

4. The apparatus of claim 1, wherein the plurality of fixed length filters is configured so that each of the plurality of fixed length filters has an offset value corresponding to one of the discrete segments of the at least one digital packet.

5. The apparatus of claim 4, wherein at least one of the plurality of fixed length filters has the offset value of 0.

6. The apparatus of claim 1, further including a filter processor comprising the plurality of fixed length filters.

7. The apparatus of claim 6, wherein the filter processor is configured to execute control logic to perform:
receiving the at least two clusters of the discrete segments of data; and
filtering the at least two clusters of the discrete segments of data with the selected at least two of a plurality of fixed length filters.

8. The apparatus of claim 1, wherein the protocol comprises DVB-T and the value comprises an IP address.

9. The apparatus of claim 1, wherein the processor is configured to execute further control logic to perform:
mapping the identification of the protocol of the data and the value to the at least two clusters of the discrete segments of data.

10. The apparatus of claim 1, wherein the client system is a DVB receiver.

11. The apparatus of claim 1, wherein the client system is a mobile terminal.

12. A method comprising:
receiving, from a client system processing clusters of data found in digital packets, an identification of at least two clusters of discrete segments of data within at least one of said digital packets, wherein a first one of the at least two clusters of data is formatted in accordance with a first protocol and a second one of the at least two clusters of data is formatted in accordance with a second protocol different than the first protocol, and wherein receiving an identification of at least two clusters includes receiving an identification of a protocol of the data and a value; and
processing the identification to select at least two of a plurality of fixed length filters to filter the at least two clusters.

13. The method of claim 12, further comprising:
generating a filter mask that identifies segments of the selected at least two of a plurality of fixed length filters.

14. The method of claim 13, further comprising:
providing filter values.

15. The method of claim 13, further comprising:
generating at least one rule for combining data filtered by the at least two of a plurality of fixed length filters.

16. The method of claim 12, further comprising:
selecting offset values for the at least two of the plurality of fixed length filters.

17. The method of claim 12, wherein the client system is a DVB receiver.

18. The method of claim 12, wherein the client system is a mobile terminal.

19. A computer-readable medium containing computer-executable instructions, that when executed by a processor, cause the processor to perform a method comprising:
receiving, from a client system processing clusters of data found in digital packets, an identification of at least two clusters of discrete segments of data within at least one of said digital packets, wherein a first one of the at least two clusters of data is formatted in accordance with a first protocol and a second one of the at least two clusters of data is formatted in accordance with a second protocol different than the first protocol, and wherein receiving an identification of at least two clusters includes receiving an identification of a protocol of the data and a value; and
processing the identification to select at least two of a plurality of fixed length filters to filter the at least two clusters.

20. The computer-readable medium of claim 19, further including computer-executable instructions, that when executed by a processor, cause the processor to perform:
generating a filter mask that identifies segments of the selected at least two of a plurality of fixed length filters.

21. The computer-readable medium of claim 20, further including computer-executable instructions, that when executed by a processor, cause the processor to perform:
   providing filter values.

22. The computer-readable of claim 20, further including computer-executable instructions, that when executed by a processor, cause the processor to perform:
   generating at least one rule for combining data filtered by the at least two of a plurality of fixed length filters.

23. The computer-readable of claim 19, further including computer-executable instructions, that when executed by a processor, cause the processor to perform:
   selecting offset values for the selected at least two of the plurality of fixed length filters.

24. The computer-readable medium of claim 19, wherein the client system is a DVB receiver.

25. The computer-readable medium of claim 19, wherein the client system is a mobile terminal.

26. A method comprising:
   receiving, from a client system processing clusters of data found in digital packets, identification of a first cluster of discrete data in a first segment of a digital packet and a second cluster of discrete data in a second segment of the digital packet, wherein the first cluster of discrete data is formatted in accordance with a first protocol and the second cluster of discrete data is formatted in accordance with a second protocol different than the first protocol, and wherein receiving an identification of the first and second clusters includes receiving an identification of a protocol of the data and a value;
   processing the identification of the first cluster of discrete data to select a first fixed length filter having an offset value corresponding to the first cluster from a plurality of fixed length filters to filter the first cluster of discrete data;
   processing the identification of the second cluster of discrete data to select a second fixed length filter having an offset value corresponding to the second cluster from the plurality of fixed length filters to filter the second cluster of discrete data; and
   providing a cluster map including the first and second fixed length filters.

27. The method of claim 26, wherein the cluster map includes the offset value of the first and second fixed length filters.

28. The method of claim 26, wherein none of the plurality of fixed length filters overlap.

29. The method of claim 26, wherein all the plurality of fixed length filters overlap.

* * * * *

UNITED STATES PATENT AND TRADEMARK OFFICE
CERTIFICATE OF CORRECTION

PATENT NO. : 7,487,254 B2  
APPLICATION NO. : 10/027048  
DATED : February 3, 2009  
INVENTOR(S) : Rod Walsh et al.

It is certified that error appears in the above-identified patent and that said Letters Patent is hereby corrected as shown below:

On the cover page, Date of Patent section (45):
 Please replace "Feb. 3, 2009" with --*Feb. 3, 2009--

On the cover page, Notice section (*):
 Please insert: --This patent is subject to a terminal disclaimer.--

Signed and Sealed this

Eighteenth Day of August, 2009

David J. Kappos
*Director of the United States Patent and Trademark Office*